Nov. 15, 1960  D. G. FALCONER  2,960,107
PRESSURE REGULATOR
Filed Jan. 13, 1956
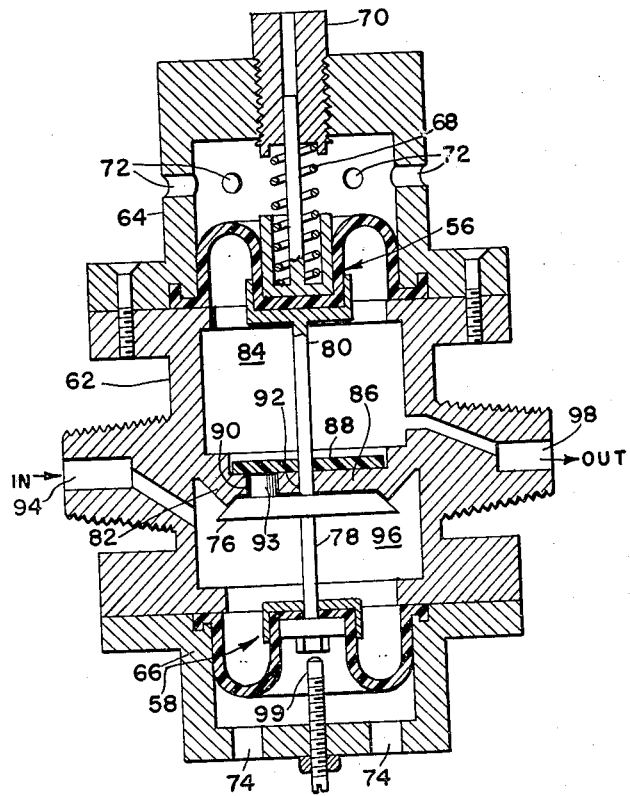
INVENTOR
DAVID G. FALCONER
BY *Cushman, Darby & Cushman*
ATTORNEY United States Patent Office 2,960,107
Patented Nov. 15, 1960

2,960,107

PRESSURE REGULATOR

David G. Falconer, Washington, D.C., assignor to Airtronic Inc., a corporation of Maryland Filed Jan. 13, 1956, Ser. No. 559,026

3 Claims. (Cl. 137—484.2)

This invention relates to fluid pressure regulation apparatus and particularly to such apparatus which regulates in terms of absolute pressure.

It has been the practice in the art to provide absolute pressure regulators in which an evacuated bellows is employed to render the apparatus immune from changes in surrounding atmospheric or fluid conditions. Such bellows are prone to develop cracks and leaks, whereby the evacuated chamber is filled with fluid, and the regulatory properties of the apparatus completely destroyed. This has been a particularly serious problem in the use of pressure regulators for supplying oxygen to members of aircraft crews under usable pressures. Obviously, in aircraft use, the surrounding atmospheric pressure is constantly changing.

It should be understood that while the present invention is particularly appricable to pressure regulation under varying atmospheric pressures as encountered in the operation of aircraft, the scope of the invention is in no way limited to such use. The invention described hereinafter has many applications.

Fluid pressure regulation apparatus may be characterized generally as having a first zone or chamber wherein the supply of fluid is present under a first and relatively high pressure, and a second zone or chamber wherein fluid is to be maintained at a relatively lower and regulated pressure. Between these chambers there is provided a suitable valve means to pass fluid from the high pressure chamber into the lower pressure chamber as required to maintain the regulated pressure within the last mentioned chamber. Such regulatory apparatus is usually characterized by a piston or pressure responsive device having the fluid under the pressure to be regulated operating against one side, and some aspect of the apparatus, either the weight of the movable structure, and/or a spring or like motor, to balance against the said regulated pressure. Changes in pressure in the regulated pressure chamber thus create differential forces with respect to the weight or spring motor means, and cause movement of the movable structure. Means is normally provided for operating the valve means in response to movement of the movable structure to bleed fluid from the high pressure chamber into the regulated or lower pressure chamber to again create a regulated pressure which will balance the movable structure.

In regulatory apparatus as just described, if the pressure of the surrounding fluid, such as an atmosphere of air, or a surrounding liquid in which the apparatus is submerged, is permitted to act upon the movable structure so as to add or subtract from the forces applied to the movable structure by gravity or the spring or like motor, changes in the surrounding fluid pressure will alter the regulatory characteristics of the device. It is such objectionable action which the present invention overcomes.

The various features of the present invention may be most readily characterized as being included in an apparatus having a first or casing structure, a second and relatively movable structure therein, a valve means, and gravity and/or motor operated means for controlling the valve means. The inventive features include the further provision of means whereby movement of the movable structure cannot permit any fluid under variable and unpredictable pressure to influence the regulatory aspects of the apparatus. In the embodiment shown a first portion of the movable structure is exposed to the fluid surrounding the apparatus, and a second portion of the movable structure also exposed to the surrounding fluid but positioned so as to permit the surrounding fluid to act on the movable structure in opposition to the action of the surrounding fluid on the first portion of the movable structure so that a balance is effected on the movable structure with respect to the surrounding fluid. As a result, changes in the pressure of the surrounding fluid do not affect the regulatory action of the apparatus.

It is, therefore, a primary object of the present invention to provide absolute pressure regulatory apparatus which is immune from changes in the pressure of a surrounding fluid.

A further object of the invention is to provide such absolute pressure regulatory apparatus having movable structure balanced to external fluid pressure.

It is a further object of the invention to provide such absolute pressure regulatory apparatus wherein check valve means is provided to establish a base for building up pressure against a regulatory piston structure and to otherwise permit operation of a balancing piston structure.

It is a further object of the invention to provide such absolute pressure regulatory apparatus wherein fluid under a relatively high pressure acts against a first piston or pressure responsive structure and a valve part to produce a first differential force tending to close said valve, and wherein lower regulated pressure in a further chamber of the apparatus creates a differential force acting in opposition upon a second piston or pressure responsive device.

Further objects and the entire scope of the invention are in part expressed and in part obvious from the following description of the invention and from the appended claims.

The principles of the present invention can best be understood by reference to the drawing, wherein there is shown, in section, a practical embodiment of a regulator embodying the principles of the present invention. In this embodiment the pressure responsive devices which balance the movable structure are in the form of flexible diaphragm type structures. Thus, there is provided an upper pressure responsive member 56 and a lower pressure responsive member 58, each of which comprises a flexible diaphragm, preferably made of silicone. Movement of the movable structure including said pressure responsive members causes a continuous folding, so to speak, of the flexible diaphragm material. The dimensions shown in the drawing are exaggerated for clarity, but those familiar with the art will understand the details of such structure. The effective diameter of the pressure responsive members can be quite accurately specified in terms of the folding zone of the diaphragm material. Of course, if desired, the pressure responsive members could consist of piston structures instead of the diaphragms shown, as will be apparent.

The stationary structure of the apparatus shown is generally characterized by a central cylindrical body portion 62, an upper cap portion 64 and a lower cap portion 66. The upper cap portion is arranged to house a suitable spring motor 68 acting between the top of the diaphragm 56 and a screw-threaded adjustable plug member 70. Ports 72 are provided for entry of the surrounding fluid. The lower cap portion 66 is similarly provided with ports 74 for permitting entry of the surrounding fluid. Diaphragms 56 and 58 should have equal effective areas exposed to the surrounding fluid, so as to create an overall balance.

In the embodiment shown the movable structure includes in addition to the above described diaphragms, a conical member 76 to serve as a valve part, a connecting rod 78 between the diaphragm 58 and the valve part 76, and a further connecting rod 80 between the valve part 76 and the upper diaphragm 56. The rod 80 may simply abut the valve part 76, but is preferably affixed thereto.

The central portion 62 of the fixed structure is characterized by an annular seat member 82 for coaction with the conical valve part 76. The central portion 62 otherwise is mainly characterized by providing a second or low pressure chamber or zone 84. A barrier member 86 exists in the zone or chamber 84 and has on the top side thereof a disc 88, preferably of flexible material, which serves as a check valve. An aperture 90 is provided in the barrier 86 for passing fluid upwardly therethrough past the check valve disc. However, the rod 80 is preferably fitted snugly in a central aperture 92 in the barrier 86. A post 93 on valve part 76 fits closely in aperture 90, but with a slight clearance for fluid to pass between post 93 and the aperture. The top of post 93 should just meet the underside of disc 88 when the valve part 76 is seated in seat 82. The bottom of barrier 86 is as close as possible to the top surface of valve part 76, so as to approach as nearly as possible zero volume in what may be termed an auxiliary chamber formed between the valve and the check valve.

The central portion 62 of the fixed structure is otherwise characterized by an inlet port 94 for introducing fluid under relatively high pressure into a first or high pressure zone 96. The central portion 62 further has an outlet port 98 from the low pressure chamber or zone 84 above the barrier 86.

As previously stated, the areas of diaphragms 56 and 58 exposed to the surrounding fluid should be of the same effective areas so that a balance can be effected. The effective cross-sectional area of the conical valve part 76 and annular seat 82 should be approximately the same as the internal effective area of the diaphragm 58. This will result in a balance or tendency of the valve means to close, due to the fluid pressure within the zone or chamber 96.

In operation, and assuming the second chamber 84 to be evacuated to permit a ready explanation of the beginning of the function, introduction of fluid under relatively high pressure into the first zone 96 will find the valve open due to the fact that lack of pressure upwardly against the bottom of diaphragm 56 has resulted in the weight of the movable structure and/or force of the spring 68 overcoming the diaphragm 56 and moving it downwardly. Downward movement of the diaphragm 56 moves the rod 80 downwardly and therefore also the conical valve part 76 as well as the lower diaphragm 58. As pressure builds up within the second zone 84 the force of gravity and/or the spring 68 will be overcome, and the movable structure will move upwardly. At a point depending on the compression of the spring 68 (and/or the weight of the parts to the extent that gravity is relied upon) the conical valve part will come into engagement with the annular seat 82. Thereafter any slight reduction of pressure in the second chamber or zone 84 will result in a slight opening of the valve to bleed more fluid from the first or high pressure chamber 96 into the second chamber 84. Regulation is thus achieved. The check valve comprising disc 88 is closed except when fluid is moving upwardly through the barrier apertures 90, thus providing a base against which the fluid within the upper portion of zone 84 may act against the upper diaphragm 56.

A stop means 99 is provided to limit the opening movement of the valve 76 to a narrow range so that a high velocity flow will be maintained across the valve whenever it is open. It is important that the stop means be accurately set, because if the opening movement is allowed to become too great the valve will become over- balanced in a downward direction and will not close when the pressure in upper chamber 84 reaches the value at which it is intended to be regulated. For example, it has been found that in a regulator of approximately the same size as shown, considering this figure as full scale, the maximum operable opening movement of the valve 76 was in a range of less than .010 inch. Within this operable range of movement the high velocity flow of fluid across the valve tends to suck or draw it closed. When the valve is opened too far, the velocity across it decreases to the point where the pressure effect tending to close it is lost and it will then tend to remain open.

It will be appreciated that in the embodiment of the invention shown and in the many other embodiments and modifications of the illustrated design within the scope of the invention, there is always an overall balance effected on the movable structure with regard to pressures exerted by a surrounding fluid medium. Thus changes in this fluid medium, as may be occasioned by any cause such as changes in altitude, or changes in depth of submersion in water, will not affect the absolute pressure regulation of the apparatus.

It can be seen that in accordance with the generic aspects of the present invention, as exemplified by the embodiment described, absolute pressure regulation apparatus is provided.

The foregoing embodiment of the invention is described only for the purpose of illustration and the scope of the invention is to be determined from the appended claims.

What is claimed is:

1. In fluid pressure regulator apparatus, a housing structure having therein a high pressure inlet chamber, a lower regulated pressure outlet chamber, and barrier means having a fluid passageway therethrough separating said chambers, check valve means in said barrier for allowing fluid to flow through said passageway only into said outlet chamber, a first pressure responsive member defining a part of said inlet chamber, a second pressure responsive member having the same effective area as said first pressure responsive member and forming part of said outlet chamber, means interconnecting said pressure responsive members, valve means comprising a movable valve element mounted on said interconnecting means to open and close said fluid passageway between said check valve and said inlet chamber, biasing means urging said interconnecting means in such a direction to open said valve means, and stop means for limiting the opening movement of said movable valve element to a narrow range to maintain a high velocity flow through said valve means when in open position, the effective areas of said movable valve element and said pressure responsive members being approximately the same.

2. In fluid pressure regulator apparatus, a first structure including means defining a first chamber, inlet port means leading to said first chamber for supplying fluid under relatively high pressure thereinto, the first structure including means defining a second chamber for containing fluid under a lower regulated pressure, a duct leading from said second chamber to outlet port means, barrier means separating said first and second chambers, said barrier means including valve seat means, a first pressure responsive member forming a part of the means defining the first chamber, a second pressure responsive member forming a part of the means defining the second chamber and having an effective area equal to the effective area of said first pressure responsive member, means interconnecting the first and second pressure responsive members, valve part means mounted on said means interconnecting said pressure responsive members, said valve part means being positioned to coact with said valve seat of said barrier means, biasing means acting between the first structure and the interconnecting means tending to move the pressure responsive members and valve part means in a direction to displace the valve part means away from the valve seat means, the effective external areas of the first and second pressure responsive members being so arranged as to effect a balance across the interconnecting means due to forces generated by a surrounding fluid acting upon the outer surfaces of said first and second pressure responsive members, check valve means operative in said barrier means to permit flow of fluid from said first chamber into said second chamber but to prevent reverse fluid flow, the arrangement being such that undesired reduction in pressure in the second chamber creates an unbalance between the inner surface of the second pressure responsive member and the forces of said motor means and whatever gravitational forces act upon said interconnecting means to move it relative to the first structure so that said valve part means moves toward open position sufficient to permit movement of fluid under high pressure in the first chamber into the second chamber to regain said desired pressure within said second chamber, and stop means for limiting the opening movement of said valve part means to a narrow range to maintain a high velocity flow between said valve seat means and said valve part means when the latter is in open position, the effective areas of said valve part means and said pressure responsive members being approximately the same.

3. In fluid pressure regulator apparatus, a first structure, a second structure movable relative to said first structure, the first structure formed to define a first chamber for containing fluid under relatively high pressure and a second chamber for containing fluid under a lower pressure, fluid valve means between said chambers and openable in response to movement of said second structure in a given direction with respect to said first structure, means for urging said valve means open, the apparatus arranged to respond to fluid pressure changes within said second chamber to act upon said second structure to operate said valve means to regulate the pressure in said second chamber, said second structure comprising a first pressure responsive member exposed to a fluid surrounding said apparatus whereby the pressure of said surrounding fluid on said first pressure responsive member tends to move the second structure in said given direction with respect to the first structure, said second structure also comprising a second pressure responsive member having the same effective area as said first pressure responsive member and exposed to said surrounding fluid, the position and arrangement of said second pressure responsive member being such as to cause the surrounding fluid to act on it in opposition to the action of the surrounding fluid on the first pressure responsive member whereby a balance is effected on the second structure with respect to said surrounding fluid so that changes in the pressure of said surrounding fluid do not affect the regulatory action of the apparatus, said second structure comprising connecting rod means interconnecting said pressure responsive members to move in unison, the first structure including barrier means between the inner surfaces of said first and second pressure responsive members, check valve means operative in said barrier means, the arrangement being such that fluid pressure within said chamber containing fluid under regulated pressure acts on the inner surface of one of the pressure responsive members, and acts against the barrier means to close said check valve, said fluid valve means comprising a movable valve element, the effective areas of said movable valve element and said pressure responsive members being approximately the same, and stop means limiting the opening movement of said movable valve element to a narow range to maintain a high velocity flow through said fluid valve means when in open position.

References Cited in the file of this patent

UNITED STATES PATENTS

| | | |
|---|---|---|
| 1,658,951 | Stitt | Feb. 14, 1928 |
| 2,313,149 | Jacobsson | Mar. 9, 1943 |

FOREIGN PATENTS

| | | |
|---|---|---|
| 556,465 | Germany | Aug. 8, 1932 |